Feb. 13, 1934.  C. T. BARD  1,947,372
AUTOMATIC GAS SHUT-OFF
Filed Sept. 2, 1933
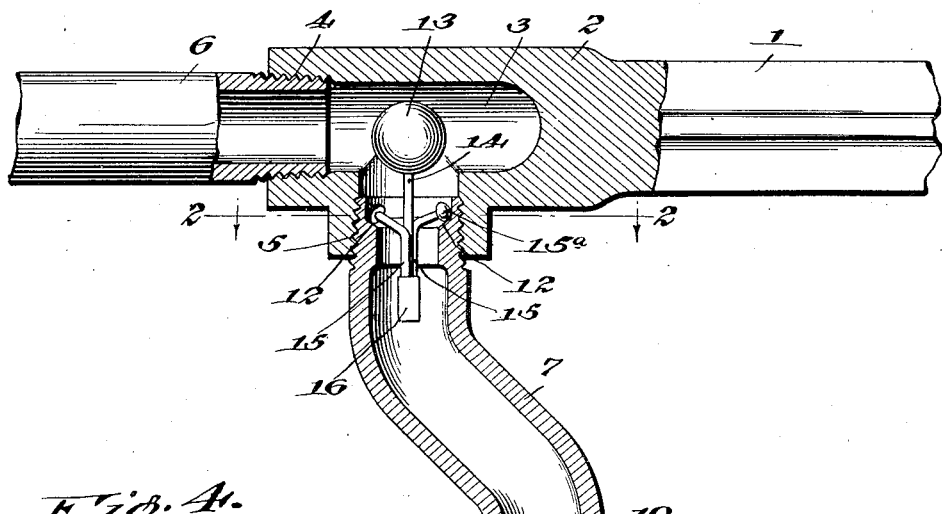
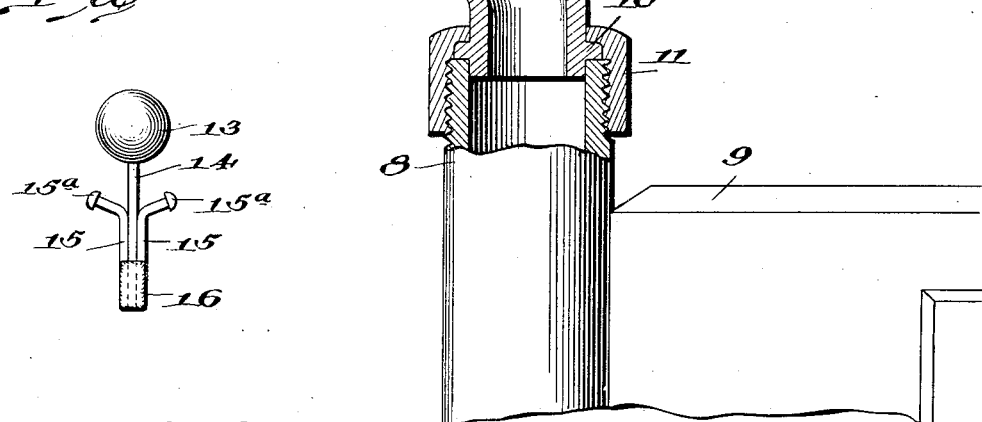
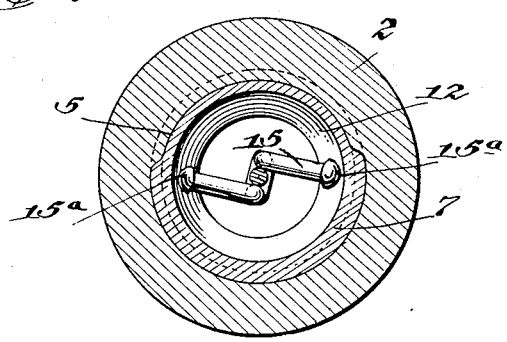
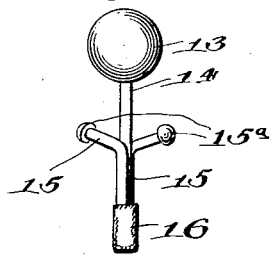
WITNESS
INVENTOR
Charles T. Bard,
BY
ATTORNEYS Patented Feb. 13, 1934

1,947,372

UNITED STATES PATENT OFFICE 1,947,372

AUTOMATIC GAS SHUT-OFF

Charles Tyler Bard, Gales Ferry, Conn.

Application September 2, 1933. Serial No. 688,050

3 Claims. (Cl. 137—162)

My invention relates to improvements in automatic gas shut offs, and it consists in the combinations, constructions and arrangements herein described and claimed.

An object of my invention is to provide a shut off of the type which will operate during a fire, for closing the inlet of the gas into a gas meter and thus preventing the ignition of the gas and the consequent conflagration which may ensue.

A further object is to provide a device of this kind having very few parts which can be cheaply made and yet which is highly effective for the purpose desired.

A further object of the invention is to provide a device of the type described which looks like an ordinary nipple connection, and which has no removable part such as a cap, by means of which the gas may be surreptitiously withdrawn.

A further object of the invention is to provide a nipple having a valve seat arranged to be closed by a ball valve which is entirely concealed, and which in fact looks like an ordinary connection.

A further object, and a very important one, is to provide an automatic shut off in which the valve and its holding members form a unit which merely rests on the seat, but which when a fire occurs, will permit the valve to engage the seat and thus make an effective closure.

Other objects and advantages will appear in the following specification, and the novel features of the invention will be particularly pointed out in the appended claims.

My invention is illustrated in the accompanying drawing forming part of this application, in which:

Figure 1 is a sectional view through a meter connection showing the normal position of the valve to permit a free flow of gas.

Figure 2 is an enlarged section on the line 2—2 of Fig. 1,

Figure 3 is a perspective view of the ball and its suspending members, and

Figure 4 is a detail view of a modified form of the device.

In carrying out my invention I may make use of a meter bar of any suitable type. In the drawing I have shown such a bar at 1, having an end 2 recessed at 3 to constitute a pipe portion and provided with threaded openings at 4 and 5 respectively. The opening at 4 is arranged to receive the threaded end of a gas pipe 6, while the opening at 5 is arranged to receive the threaded end of a nipple 7 which forms the connection to the inlet 8 of the meter 9. In the present instance I have shown this nipple 7 as being curved but other forms might be used without departing from the spirit of the invention.

The nipple 7 is provided at one end with a flange 10 which abuts the end of the pipe 8 and it is held by means of a union 11. At 12 is a seat which is machined accurately to conform to the ball valve 13.

The ball valve 13 is provided with a bore not shown into which a wire 14 extends. On each side of the wire 14 are portions 15 which are shaped like bent nails, and which have head portions 15a. The end of the members 15 and 14 are secured together as shown at 16 by solder.

From the foregoing description of the various parts of the device the operation thereof may be readily understood. The members 13 to 16 inclusive form a unit and this unit is placed in the end of the nipple with the heads 15a resting on the valve seat 12. The nipple may then be connected to the pipe 2 and also to the pipe 8 by means of the union 11. The apparatus will then be in the position shown in Fig. 1. Now when a fire occurs, the solder 16 is melted. The members 15 being no longer supported, drop downwardly into the nipple and the ball 13 passes downwardly until it engages the seat 12 when it seals the pipe or nipple 7 effectively.

I have described the preferred form of the device as shown in Figs. 1, 2 and 3 in which the wires 15 are soldered to the side of the central stem 14 and then are bent laterally, the bent arms being tangent to the central stem. When the solder melts the wires are free to instantly fall back out of engagement with the central wire.

In Fig. 4 I have shown a modification in which the bent portions of the wire are in the same plane with the central wire 14. This form of the device would fall within the purview of the invention.

I am aware of constructions in which a connecting member has an opening filled with solder which, when melted, will permit the movement of a valve to seat and to therefore shut off a flow. An opening through such connection, however, has disadvantages which this invention is designed to overcome. The stem 14 has ample room in which to move. It does not move through any exterior opening in the connections and hence would not be prevented in such movement by obstructions on the exterior of the connections.

I am also aware of complicated valve structures which have to be especially made, and which are costly. The only cost in the present instance is the machining of the valve seat, which of course is necessary in every shut off, and the provision of the ball valve and its supporting members. The construction is such that the ball is held immediately above the center of the valve seat and drops into it when the supporting members are released by the solder. Furthermore, the holding members 15 keep the ball centered even though the nipple may be tilted, as for instance in threading it into the pipe. The solder which holds the retaining members together, tends to counterbalance the ball so as to bring it into position even if it has been jarred out of position.

I am also aware that it has been proposed to support the valve by means of wires on a fusible support which support is carried in an opening in one side of the nipple. The advantage of my construction lies in the fact that when the solder is melted it does not leave an opening in the nipple as is the case where the solder fills a hole in the nipple and forms the support for the wires. In the latter case as distinguished from my invention, when the solder melts the gas finds its way through the opening and may cause additional damage.

While I have illustrated a meter bar in connection with my invention it is obvious that any suitable pipe might be used without departing from the spirit of the invention.

I claim:

1. An automatic gas shut off comprising a nipple having a threaded end and provided with a valve seat near the threaded end, a pipe connected with the nipple, a ball valve, a stem for supporting the valve, retaining members disposed on each side of the stem and having their ends bent laterally and being provided with heads arranged to engage the valve seat, said retaining members and said stem being soldered together at their bottoms and being movable away from the valve seat when the solder melts, thereby permitting the seating of the ball on the valve seat.

2. An automatic gas shut off comprising a nipple having a threaded end and provided with a valve seat near the threaded end, a pipe connected with the nipple, a ball valve, a stem for supporting the ball valve, retaining members disposed on each side of the stem and having their ends bent laterally tangent to the stem, said ends being arranged to engage the valve seat, said retaining members and said stem being soldered together at their bottoms and being movable away from the valve seat when the solder melts, thereby permitting the seating of the ball on the valve seat.

3. An automatic gas shut off comprising a pipe, a nipple having a threaded end connected with the pipe and being provided with a valve seat near said threaded end, a ball valve, a stem for supporting the ball valve, and retaining members soldered to the stem within the nipple and having portions arranged to engage the valve seat for holding the ball valve above the seat while permitting the flow of gas through the nipple.

CHARLES TYLER BARD.